(12) United States Patent
Uno et al.

(10) Patent No.: US 7,831,261 B2
(45) Date of Patent: Nov. 9, 2010

(54) COMMUNICATION TERMINAL

(75) Inventors: Nobukazu Uno, Kamakura (JP); Hiromi Himeno, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 398 days.

(21) Appl. No.: 11/299,824

(22) Filed: Dec. 13, 2005

(65) Prior Publication Data

US 2006/0160561 A1 Jul. 20, 2006

(30) Foreign Application Priority Data

Dec. 13, 2004 (JP) ............................. 2004-360256

(51) Int. Cl.
*H04W 24/00* (2009.01)
(52) U.S. Cl. .............. 455/456.3; 455/414.1; 455/414.2; 455/414.3; 455/429; 455/432.1; 455/436
(58) Field of Classification Search ............. 455/414.1, 455/414.2, 414.3, 429, 432.1, 436, 456.3
See application file for complete search history.

(56) References Cited

U.S. PATENT DOCUMENTS

| | | | |
|---|---|---|---|
| 6,226,527 B1 * | 5/2001 | Dalsgaard et al. | 455/553.1 |
| 6,377,804 B1 | 4/2002 | Lintulampi | |
| 6,567,667 B1 | 5/2003 | Gupta et al. | |
| 6,944,452 B2 * | 9/2005 | Coskun et al. | 455/436 |
| 7,305,232 B2 * | 12/2007 | Ono et al. | 455/414.2 |
| 2003/0036379 A1 | 2/2003 | Nikolai et al. | |
| 2004/0252695 A1 * | 12/2004 | Rasanen et al. | 370/395.2 |
| 2004/0258136 A1 * | 12/2004 | Liu et al. | 375/133 |
| 2005/0180449 A1 * | 8/2005 | Ranta-Aho et al. | 370/437 |
| 2005/0220040 A1 * | 10/2005 | Petrovic et al. | 370/278 |

FOREIGN PATENT DOCUMENTS

| | | |
|---|---|---|
| EP | 0 858 237 A2 | 8/1998 |
| GB | 2 363 288 | 12/2001 |
| JP | 2004-147049 | 5/2004 |
| JP | 2004-201012 | 7/2004 |
| JP | 2004-207822 | 7/2004 |
| JP | 2005-518143 | 6/2005 |
| WO | WO 03/032598 A1 | 4/2003 |
| WO | WO 03/069835 A1 | 8/2003 |

* cited by examiner

*Primary Examiner*—Patrick N. Edouard
*Assistant Examiner*—Shantell Heiber
(74) *Attorney, Agent, or Firm*—Oblon, Spivak, McClelland, Maier & Neustadt, L.L.P.

(57) ABSTRACT

A communication terminal capable of efficiently performing download of a file is provided. A communication terminal 1 includes an input detection section 10, a request section 12, a reception section 14, and a recognition section 16. When the input detection section 10 detects an input of an information request number by a user, the request section 12 transmits a request to a network 6 to transmit a service-availability information. The service-availability information consists of area information indicating whether or not a serving cell of the communication terminal 1 is included in an HSDPA service area and resource information indicating whether or not allocation of HSDPA resource to the communication terminal 1 is possible, when the serving cell of the communication terminal 1 is included in the HSDPA service area. The reception section 14 receives the service-availability information transmitted from the network 6 and the recognition section 16 displays an antenna mark on a display section 18 based on the area information and the resource information included in the service-availability information.

8 Claims, 6 Drawing Sheets

COMMUNICATION TERMINAL

BACKGROUND OF THE INVENTION

1. Field of the Invention

The present invention relates to a communication terminal capable of adapting to an environment in which plural kinds of communication having characteristics different from those of the communication in the normal mode coexist.

2. Related Background of the Invention

Conventionally, as disclosed in, for example, Japanese Patent Application Laid-open No. 2004-147049, a communication terminal is known, which performs packet communication by utilizing high speed data communication.

SUMMARY OF THE INVENTION

By the way, a case is considered, where an area in which packet communication is possible consists of an area in which high speed data communication is possible (hereinafter, referred to as a high speed data communication area) and an area in which high speed data communication is not possible (hereinafter, referred to as a non-high speed data communication area).

In this case, a communication terminal capable of both communication, that is, the high speed data communication and data communication other than the high speed data communication, is used as a result. However, for example, there is a possibility that such a communication terminal performs download of a file with a large quantity of data in a non-high speed data communication area. Therefore, there arises a problem that it is not possible to efficiently perform download of a file.

Therefore, an object of the present invention is to provide a communication terminal capable of efficiently performing download of a file.

A communication terminal of the present invention is a communication terminal capable of communication having specific characteristics, including (1) a request means for making a request to a network to transmit a service-availability information indicating whether or not the communication having the specific characteristics is possible in a serving cell where the present communication terminal is located, (2) a reception means for receiving the service-availability information from the network that has received the request from the request means, and (3) a recognition means for, when the service-availability information received through the reception means is one indicating that the communication having the specific characteristic is possible, making a user recognize the information.

As described above, since the service-availability information is transmitted in response to the request from the communication terminal, if a request is transmitted from the communication terminal before starting download of a file, for example, it is possible to acquire the service-availability information at the present position. When the received service-availability information is one indicating that the communication having the specific characteristics is possible, the recognition means makes the user recognize this information, therefore, it is possible for the user to know for example by the display that the communication having the specific characteristics is possible on site. Due to this, it is possible for the user to determine how large a file to download should be while watching the display. Therefore, it is possible to efficiently perform download of a file.

In the communication terminal of the present invention, it is preferable for the request means to request the service-availability information after a predetermined operation by a user is detected. Due to this, it is made possible to acquire the service-availability information in accordance with, for example, a number inputted by the user.

As for the communication terminal of the present invention, it is also preferable for the request means to request the service-availability information after a predetermined change in environment is detected. Due to this, it is made possible to, for example, acquire the service-availability information in accordance with the movement of the terminal from a serving cell to another.

Preferably the communication terminal of the present invention further includes a storage means for, when the communication having the specific characteristics is possible in a serving cell where the present communication terminal is located, storing a serving cell identification information for identifying the serving cell, a detection means for detecting that the serving cell of the present communication terminal has changed, and a judgment means for judging whether or not the cell identification information of the serving cell after the change is stored in the storage means in accordance with detection by the detection means, wherein, when the cell identification information of the serving cell after the change is judged to be stored in the storage means by the judgment means, the recognition means makes a user recognize the information that the communication having the specific characteristics is possible in the serving cell.

As described above, since the cell identification information of the serving cell is stored when the communication having the specific characteristics is possible in the serving cell, it is possible to reserve information about the cell in which the communication having the specific characteristics is possible. When the serving cell changes, the storage means is searched and when the cell identification information of the new serving cell is stored in the storage means, a user is made to recognize the information that the communication having the specific characteristics is possible in this serving cell, therefore, it is possible for the user to judge that the communication having the specific characteristics is possible without connection to the network.

As for the communication terminal of the present invention, it is preferable for the recognition means to have a display means for displaying the information that the communication having the specific characteristics is possible. Due to this, it is possible for a user to know whether or not the communication having the specific characteristics is possible at present only by watching the display means.

It is also preferable for the communication terminal of the present invention that the communication having the specific characteristics be high speed data communication. By using the communication with a high data transmission rate, it is possible to smoothly perform download of a file.

It is also preferable for the communication terminal of the present invention that the high speed data communication be communication by an HSDPA. When the communication by the HSDPA is used, it is possible to further smoothly perform download of a file because the communication by the HSDPA is effective on packet communication.

According to the communication terminal of the present invention, it is possible to efficiently perform download of a file.

DESCRIPTION OF THE PREFERRED EMBODIMENTS

The concept of the present invention will be easily understood by considering the following detailed description with reference to attached drawings shown only for illustrations. Subsequently, embodiments of the present invention will be described with reference to the attached drawings. When possible, the same symbols will be attached to the same portions and duplicated description will be omitted.

Figure 1:
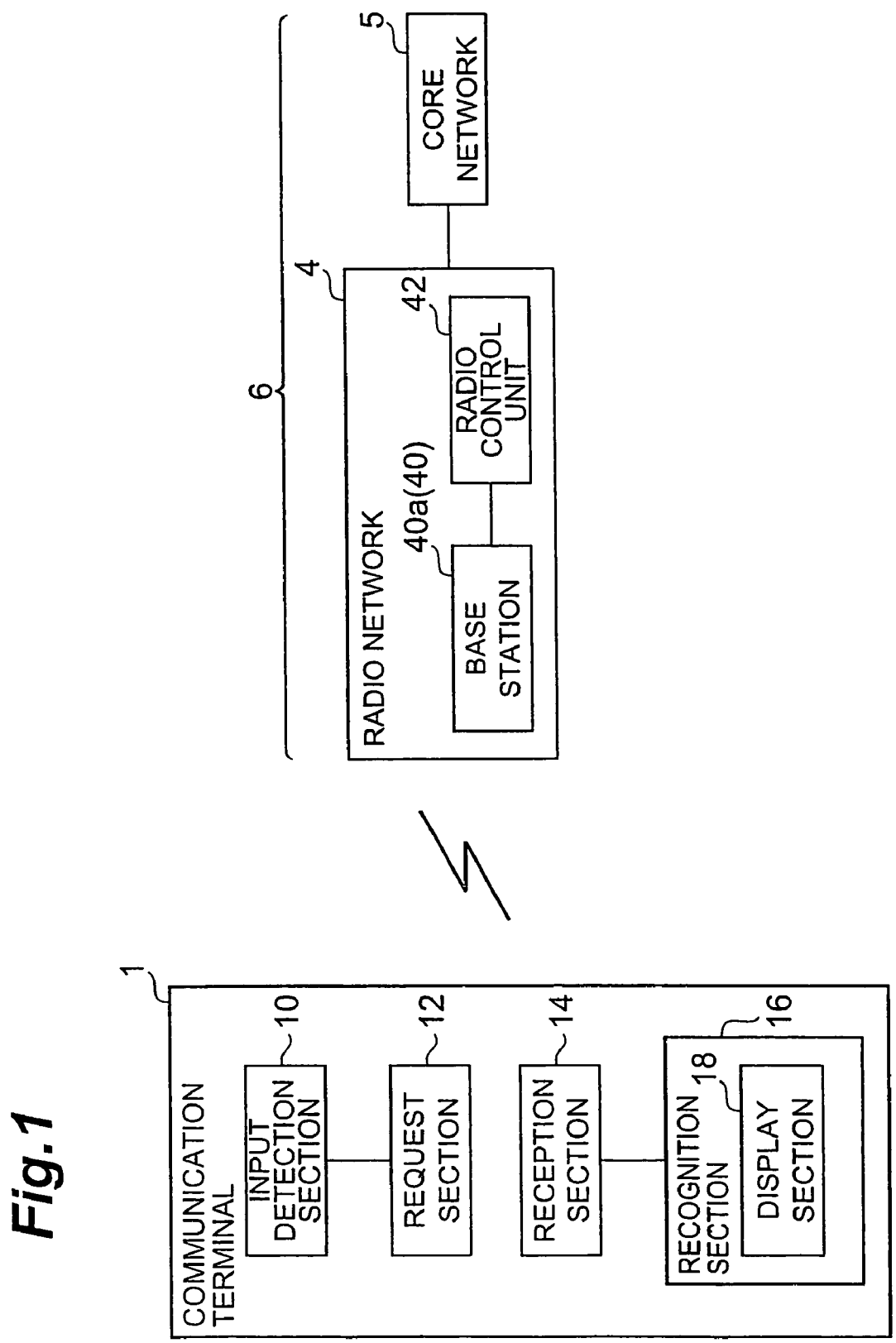
FIG. 1 is a diagram showing a configuration of a communication terminal according to a first embodiment.

FIG. 1 is a diagram showing a configuration of a communication terminal 1 according to a first embodiment of the present invention. The communication terminal 1 is a mobile communication terminal capable of the communication having the specific characteristics. Here, the communication having the specific characteristics is a communication having characteristics different from the normal mode. As an example of such communication, there is a high speed data communication. The high speed data communication is a communication that has increased data transmission rate compared to the normal mode by, for example, changing the modulation scheme and/or increasing the number of channels to be used. As another example of the communication having characteristics different from the normal mode, there is a packet communication where the normal mode is used for voice communication in multimode communication (a communication environment capable of plural communication systems). The communication terminal 1 of the present embodiment is a mobile communication terminal capable of the communication using the HSDPA (High Speed Downlink Packet Access), which is one of high speed data communications. Incidentally, the communication terminal 1 of the present embodiment is capable of the communication using the HSDPA, however, it may be one capable of high speed network communication by use of the EV-DO and other communication systems. Such a communication terminal 1 is connected to a network 6.

The network 6 includes a radio network 4 and a core network 5 which is connected to the radio network 4 and is operated by a mobile communication carrier.

The radio network 4 has plural base stations 40 including a base station 40a in a serving cell of the communication terminal 1 and a radio control unit 42. The base stations 40 are divided into two types; an HSDPA-capable base station and an HSDPA-incapable base station. The HSDPA-capable base station is a base station provided with facilities for enabling packet communication by use of the HSDPA. On the other hand, the HSDPA-incapable base station is a base station provided with facilities for enabling packet communication by use of the conventional W-CDMA but not provided with facilities for enabling the packet communication by use of the HSDPA.

These plural base stations 40 are connected to the radio control unit 42. The radio control unit 42 has in advance information about whether the respective base stations 40 are the HSDPA-capable base station or the HSDPA-incapable base station.

In such a network 6, a request to transmit the service-availability information transmitted from the communication terminal 1 is received by the core network 5 via the base station 40a and the radio control unit 42 of the radio network 4. The core network 5 generates the service-availability information and transmits the service-availability information to the communication terminal 1 via the base station 40a and the radio control unit 42 of the radio network 4.

The communication terminal 1 is a communication terminal capable of the communication by the HSDPA. The communication terminal 1 includes a CPU (Central Processing Unit), a communication device, an input device such as a push button, a storage device such as a memory, and a display device such as a display, etc., as physical components. The communication terminal 1 includes an input detection section 10, a request section 12 (a request means), a reception section 14 (a reception means), and a recognition section 16 (a recognition means) as functional components.

The input detection section 10 is a section for detecting predetermined operations by a user. Here, the predetermined operations are those using the USSD (Unstructured Supplementary Services Data) procedure performed during communication or during waiting, and as one example, there is an input operation of an information request number. The information request number is, for example, a four-digit number. When an input of the information request number by a user is detected, the input detection section 10 outputs a notification that the operation by a user is detected to the request section 12.

In addition, as another example of the predetermined operations, there is an operation for opening a communication terminal 1 when the communication terminal 1 is a mobile telephone set of folding-type. Since such an operation is detected by the input detection section 10, a notification is output to the request section 12 each time a user opens the communication terminal 1 to watch the display, therefore, a troublesome operation such as inputting of an information request number is no longer necessary. Moreover, as another example of the predetermined operations, there is an operation such as pressing down of a button for packet communication, which is one of the push buttons of the communication terminal 1. Since such an operation is detected by the input detection section 10, a notification is output to the request section 12 each time packet communication is performed, therefore, a troublesome operation such as inputting of an information request number is no longer necessary. Furthermore, when the communication terminal 1 is a card-type communication terminal to be connected to a personal computer, such an operation of inserting the communication terminal 1 into the personal computer may be included in the predetermined operations.

The request section 12 is a section for making a request to the network 6 to transmit the service-availability information, which will be described later. More specifically, upon receipt from the input detection section 10 of a notification that an operation by a user is detected, the request section 12 transmits a request to the network 6 to transmit the service-availability information.

The reception section 14 is a section for receiving the service-availability information from the network 6. The reception section 14 outputs the received service-availability information to the recognition section 16.

Here, the service-availability information will be described. The service-availability information is an information indicating whether or not the communication by the HSDPA is possible in a serving cell of the communication terminal 1. The service-availability information is composed of an area information and a resource information.

The area information is an information indicating whether or not the serving cell of the communication terminal 1 is included in an HSDPA service area. The HSDPA service area is an area composed of cells which the HSDPA-capable base stations form, and when the serving cell of the communication terminal 1 is included in the HSDPA service area, the area information will be one indicating "within the HSDPA service area zone". On the other hand, when the serving cell of the communication terminal 1 is not included in the HSDPA service area, the area information will be one indicating "outside the HSDPA service area zone".

The resource information is an information indicating whether or not an unused resource required for performing communication is available in the radio resource for the HSDPA (hereinafter, referred to as an HDSPA resource), that is, whether or not allocation of the HSDPA resource to the communication terminal 1 is possible, when the serving cell of the communication terminal 1 is included in the HSDPA service area. When allocation of the HSDPA resource to the communication terminal 1 is possible, the resource information will be one indicating "resource allocation is possible". On the other hand, when allocation of the HSDPA resource to the communication terminal 1 is not possible, the resource information will be one indicating "resource allocation is not possible".

The recognition section 16 is a section for making a user recognize the contents of the service-availability information received from the reception section 14. The recognition section 16 has a display section 18, which is a display (not shown) of the communication terminal 1. More specifically, the recognition section 16 receives the service-availability information from the reception section 14 and extracts the area information and the resource information from the service-availability information. Then, the recognition section 16 displays an antenna mark on the display section 18 based on the extracted information.

Figure 2:
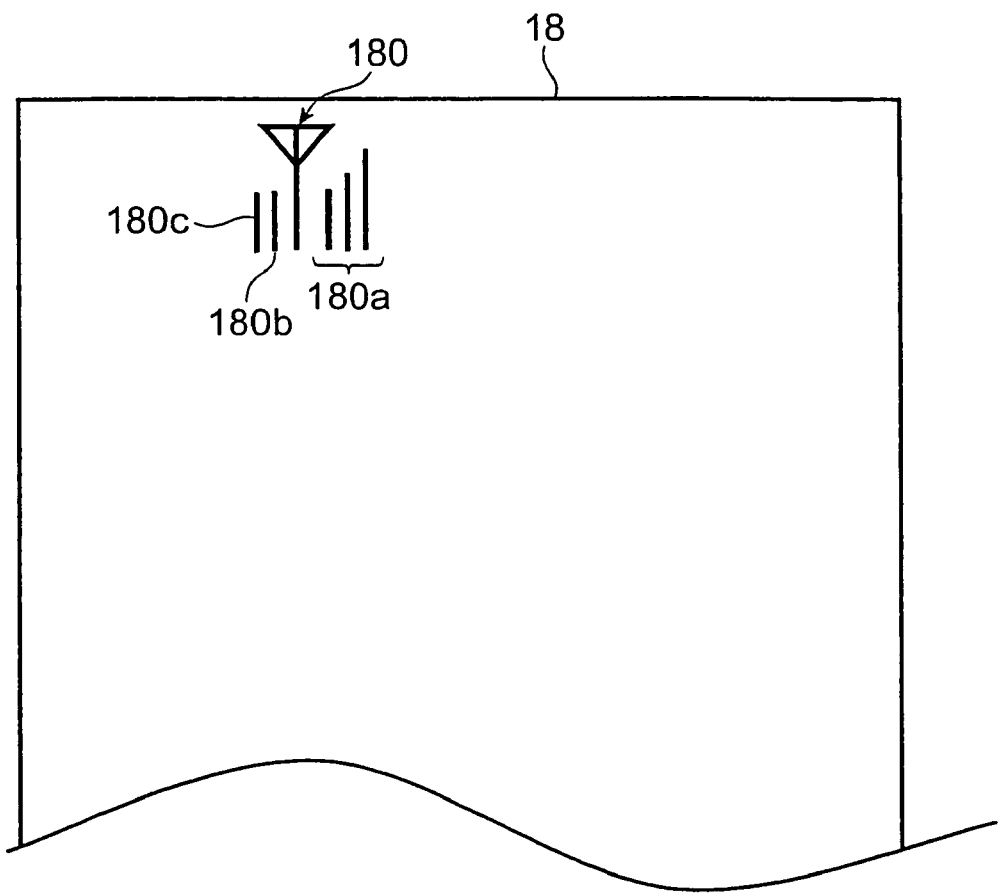
FIG. 2 is a diagram showing an example of a display on a display section.

FIG. 2 is a diagram showing an example of a display of an antenna mark 180 on the display section 18. According to the example shown in FIG. 2, three vertical bars 180a on the right-hand side of the antenna mark 180 show a state of radio waves as in a general communication terminal. Then, vertical bars 180b and 180c on the left-hand side of the antenna mark 180 show the area information and the resource information, respectively. When the area information is one indicating "within the HSDPA service area zone", the vertical bar 180b is displayed. In addition, when the resource information is one indicating "resource allocation is possible", the vertical bar 180c is displayed on the left-hand side of the vertical bar 180b. Therefore, when the HSDPA can be used, both the vertical bars 180b and 180c are displayed. Incidentally, preferably, the vertical bars 180b and 180c may be displayed in different colors for easy discrimination from each other.

Figure 3:
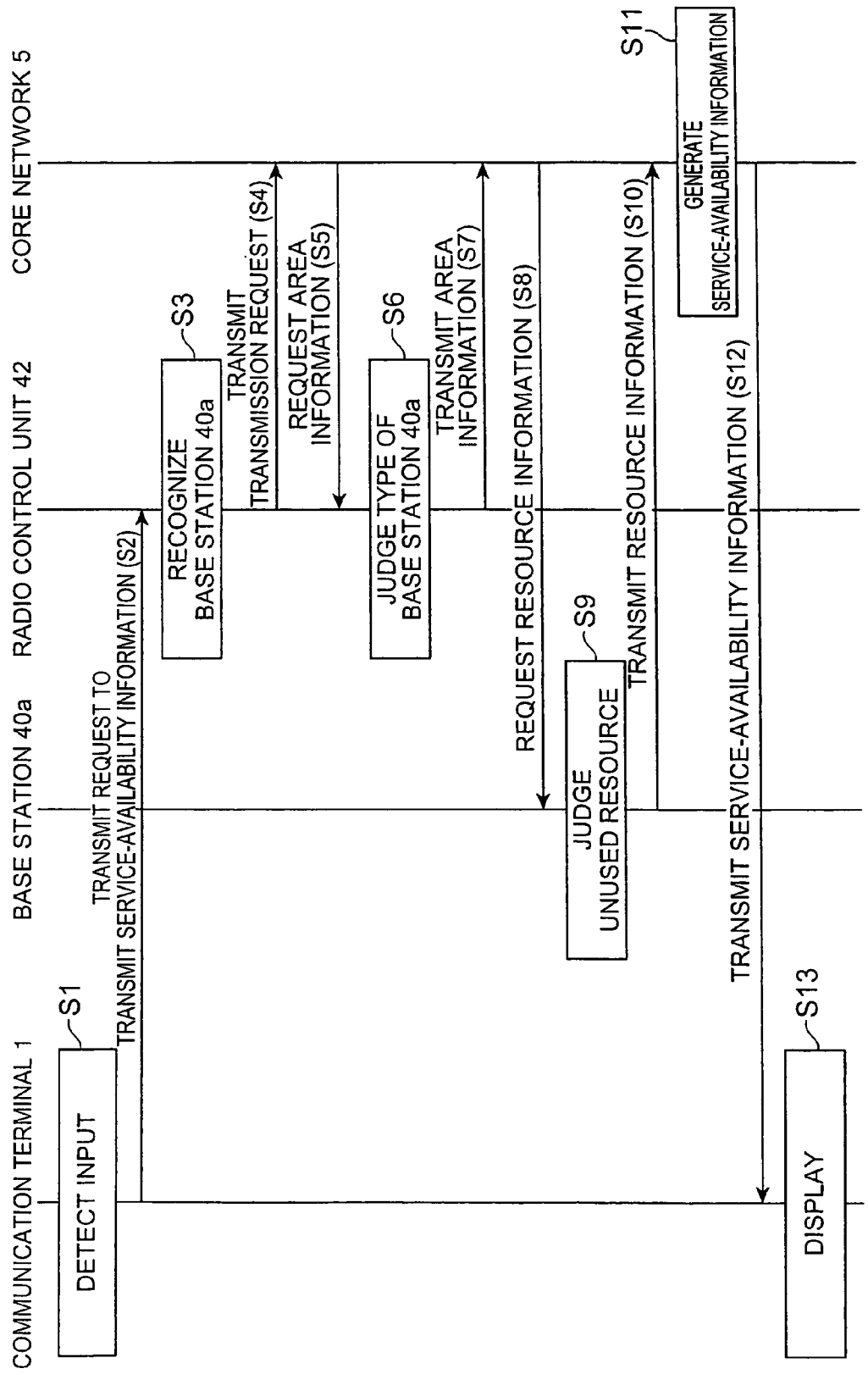
FIG. 3 is a sequence diagram showing processing of the communication terminal according to the first embodiment.

Next, the operation of the communication terminal 1 in the present embodiment will be described. FIG. 3 is a sequence diagram showing processing of the communication terminal 1.

First, when an information request number is inputted by a user, this is detected by the input detection section 10 of the communication terminal 1 (step S1). The input detection section 10 outputs a notification that the operation by the user was detected to the request section 12. The request section 12 that has received the notification transmits a request to the network 6 to transmit the service-availability information (step S2).

The radio control unit 42 of the radio network 4 receives the transmission request via the base station 40a. Based on the communication channel of the transmission request, the radio control unit 42 recognizes that the serving base station of the communication terminal 1 is the base station 40a (step S3). Then, the radio control unit 42 transmits the transmission request to the core network 5 (step S4).

Upon receipt of the transmission request from the radio network 4, the core network 5 requests the area information to the radio control unit 42 (step S5). The radio control unit 42 that has received the request for the area information judges whether the base station 40a which the radio control unit 42 has recognized upon receipt of the transmission request is the HSDPA-capable base station type or the HSDPA-incapable base station type (step S6). When the judgment result is that the base station 40a is the HSDPA-capable base station, the area information indicating "within the HSDPA service area zone" is returned to the core network 5, and when the base station 40a is the HSDPA-incapable base station, the area information indicating "outside the HSDPA service area zone" is returned to the core network 5 (step S7).

The core network 5 receives the area information from the radio control unit 42. When the area information is one indicating "outside the HSDPA service area zone", the core network 5 generates the service-availability information including the area information and the resource information indicating "resource allocation is not possible" (step S11) and transmits these information to the communication terminal 1 (step S12). On the other hand, when the received area information is one indicating "within the HSDPA service area zone", the core network 5 requests the resource information to the radio control unit 42 (step S8).

The radio control unit 42 requests the resource information to the base station 40a. The base station 40a that has received the request for the resource information judges whether or not allocation of the HSDPA resource to the communication terminal 1 is possible (step S9). When the judgment result is that it is possible, the base station 40a transmits the resource information indicating "resource allocation is possible", or the resource information indicating "resource allocation is not possible" when it is not possible, to the core network 5 via the radio control unit 42 (step S10).

The core network 5 generates the service-availability information including the already received area information indicating "within the HSDPA service area zone" and the resource information received from the radio control unit 42 (step S11) and transmits the generated service-availability information to the communication terminal 1 via the radio network 4 (step S12).

The reception section 14 of the communication terminal 1 receives the service-availability information transmitted from the core network 5 via the radio network 4. Then, the reception section 14 outputs the received service-availability information to the recognition section 16. The recognition section 16 displays the antenna mark 180 on the display section 18 based on the area information and the resource information included in the service-availability information (step S13). When the area information is one indicating "within the HSDPA service area zone", the recognition section 16 displays the vertical bar 180b of the antenna mark 180. When the resource information is one indicating "resource allocation is possible", the recognition section 16 displays the vertical bar 180c of the antenna mark 180.

The function and the effect of the present embodiment will be described. As described above, when the input detection section 10 of the communication terminal 1 detects an input of an information request number by a user, the request section 12 transmits a request to the network 6 to transmit the service-availability information. Due to this, it is possible for the user to acquire the service-availability information at the present position when necessary. The reception section 14 receives the service-availability information transmitted from the network 6 and the recognition section 16 displays the antenna mark 180 based on the area information and the resource information included in the service-availability information. Due to this, it is possible for the user to know whether or not the communication by the HSDPA is possible by watching the vertical bars 180b and 180c of the antenna mark 180. If whether or not the communication by the HSDPA is possible can be known, it is possible for the user to perform download of a file or Web access while taking into consideration the communication rate etc. Further, when the charging system of the communication by the HSDPA is different from that of communication by other systems, it is possible to perform download of a file etc. while taking into consideration not only the communication rate but also the charge.

Figure 4:
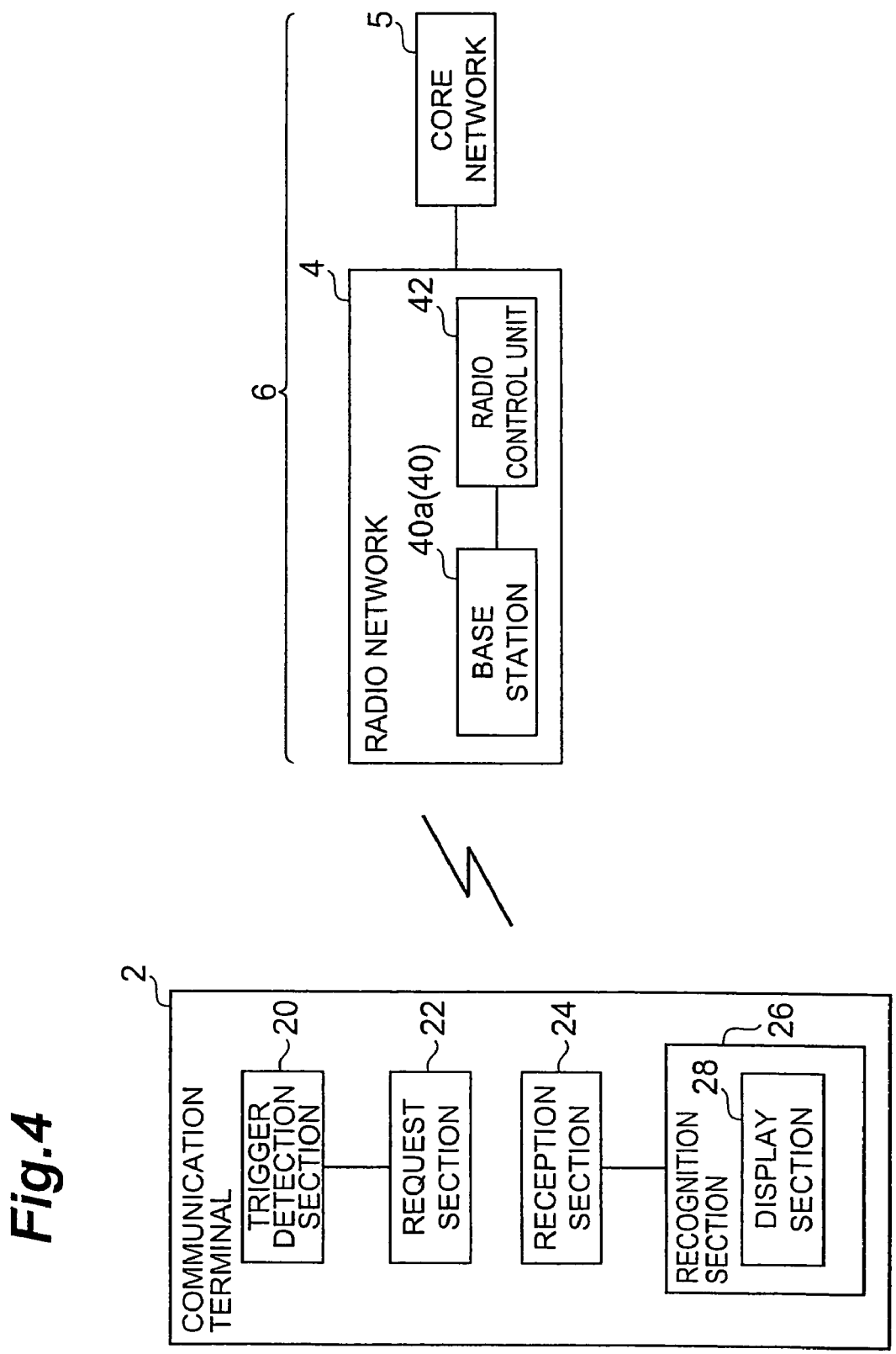
FIG. 4 is a diagram showing a configuration of a communication terminal according to a second embodiment.

FIG. 4 is a diagram showing a configuration of a communication terminal 2 according to a second embodiment of the present invention. The communication terminal 2 includes a trigger detection section 20 instead of the input detection section 10 of the communication terminal 1 of the first embodiment. Incidentally, the communication terminal 2 includes a reception section 24, a recognition section 26, and a display section 28 and these have the same functions as those of the reception section 14, the recognition section 16, and the display section 18 of the communication terminal 1, respectively.

The trigger detection section 20 is a section for detecting a predetermined change in environment. The predetermined change in environment is a change of a serving cell caused by the movement of the communication terminal 2 of the present embodiment. In addition, as another change in environment, there is the case where restrictions on calls placed in order to avoid congestion on the network 6 side are removed etc. When detecting a change of a serving cell, the trigger detection section 20 notifies a request section 22 of the information.

The request section 22 is a section for receiving a notification that a change in environment is detected from the trigger detection section 20. When receiving such a notification, the request section 22 transmits a request to the network 6 to transmit the service-availability information. Processing in the network 6 that has received the request to transmit the service-availability information is the same as that described in the first embodiment.

The operation of the communication terminal 2 of the present embodiment will be described. In the communication terminal 2, the trigger detection section 20 detects a change of a serving cell. The trigger detection section 20 notifies the request section 22 that a change of the serving cell is detected, and the request section 22 that has received the notification transmits a request to the network 6 to transmit the service-availability information. The operation after the transmission request is transmitted to the network 6 is the same as that shown in steps S3 to S13 in FIG. 3.

The function and the effect of the present embodiment will be described. As described above, when detecting the change of the serving cell, the trigger detection section 20 notifies the request section 22 of the information. In response to the request from the request section 22 that has received the notification, the service-availability information is transmitted from the network 6. Due to this, it is possible for the user to know whether or not the communication by the HSDPA is possible at each position after movement without performing specific operations.

Figure 5:
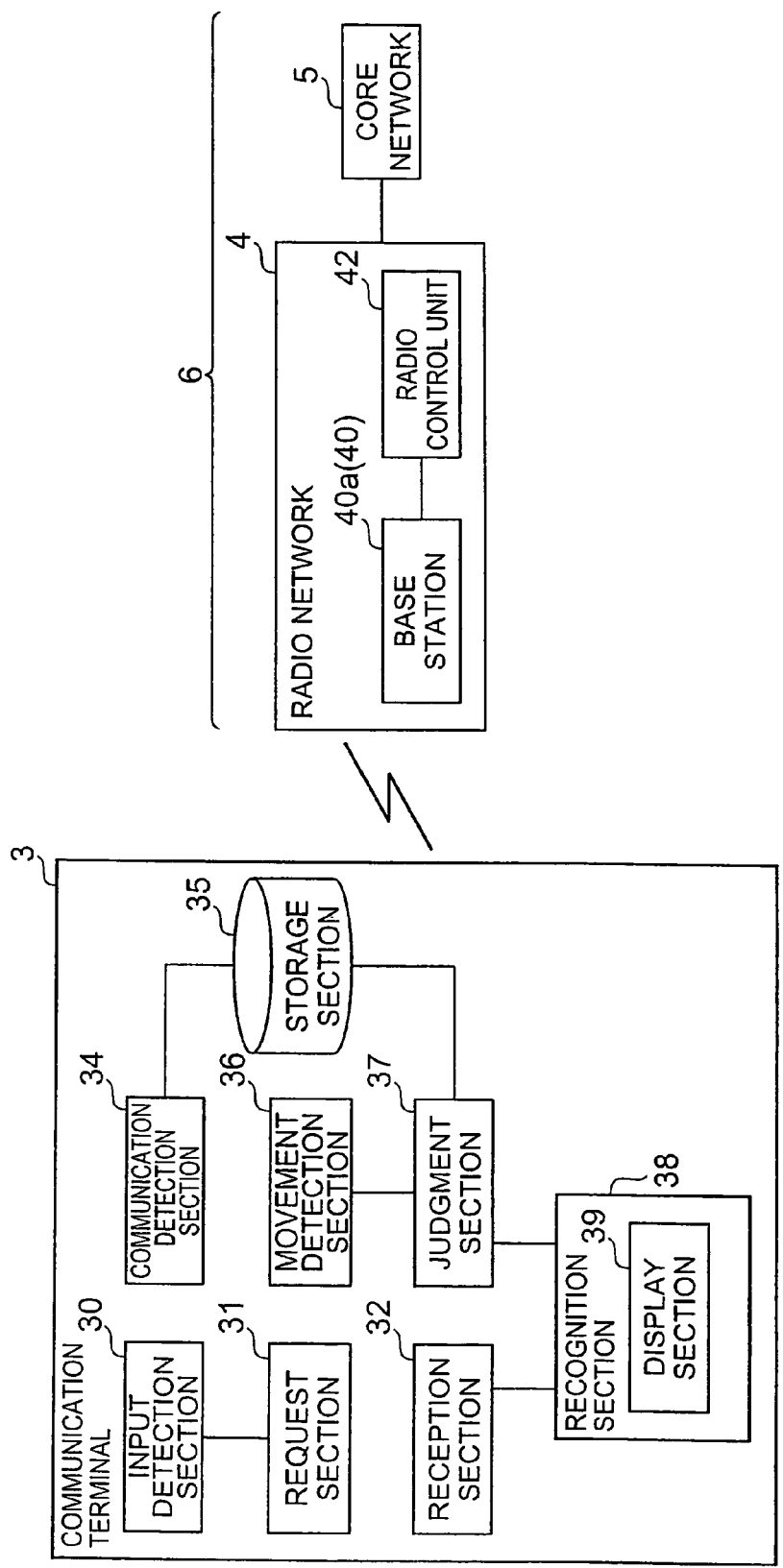
FIG. 5 is a diagram showing a configuration of a communication terminal according to a third embodiment.

FIG. 5 is a diagram showing a configuration of a communication terminal 3 according to a third embodiment of the present invention. The communication terminal 3 differs from the communication terminal 1 of the first embodiment in including a communication detection section 34, a storage section 35 (a storage means), a movement detection section 36 (a detection means), and a judgment section 37 (a judgment means). In addition, the communication terminal 3 includes an input detection section 30, a request section 31, and a reception section 32 and these have the same functions as those of the input detection section 10, the request section 12, and the reception section 14 of the communication terminal 1.

The communication detection section 34 is a section for detecting termination of communication when the communication by the HSDPA is performed at the communication terminal 3. More specifically, when detecting termination of the communication by the HSDPA, the communication detection section 34 identifies the cell ID (cell identification information) of the serving cell of the communication terminal 3 based on a broadcast information received from the network 6. Then, the identified cell ID is stored in the storage section 35.

The movement detection section 36 is a section for detecting that the serving cell of the communication terminal 3 has changed. More specifically, the movement detection section 36 extracts the cell ID included in the broadcast information each time the broadcast information is transmitted from the network 6 to the communication terminal 3. The movement detection section 36 judges that the serving cell has changed when the extracted cell ID differs from the previously extracted cell ID. When it is judged that the serving cell has changed, the movement detection section 36 outputs notification that the serving cell has changed along with the cell ID after the change to the judgment section 37.

The judgment section 37 is a section for judging whether or not the cell ID after the change is stored in the storage section 35. More specifically, the judgment section 37 receives notification that the serving cell has changed from the movement detection section 36. Then, the cell ID received along with the notification is searched for from among the cell IDs stored in the storage section 35. When the cell ID received from the movement detection section 36 is stored in the storage section 35, the judgment section 37 outputs the area information indicating "within the HSDPA service area zone" to a recognition section 38.

The recognition section 38 includes a display section 39 that is a display (not shown) of the communication terminal 3. The recognition section 38 and the display section 39 have the same functions as those of the recognition section 16 and the display section 18 of the communication terminal 1. When receiving the area information indicating "within the HSDPA service area zone" from the judgment section 37, the recognition section 38 displays the antenna mark with the vertical bar indicating "within the HSDPA service area zone" on the display section 39.

Figure 6:
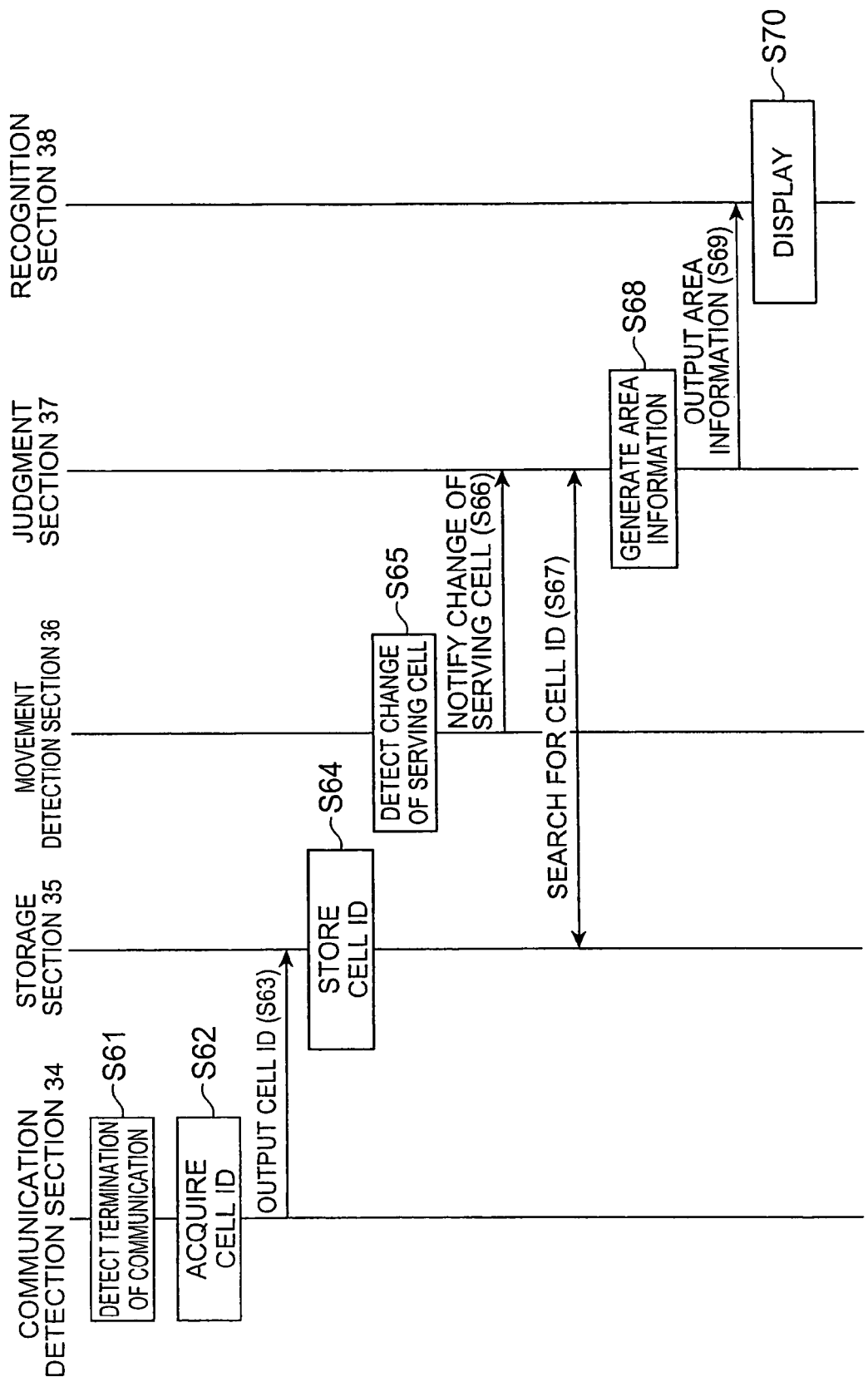
FIG. 6 is a sequence diagram showing processing of the communication terminal according to the third embodiment.

The operation of the communication terminal 3 of the present embodiment will be described. FIG. 6 is a sequence diagram showing processing of the communication terminal 3.

When the communication by the HSDPA is performed at the communication terminal 3 and the communication is terminated, the communication detection section 34 detects this (step S61). The communication detection section 34 that has detected termination of the communication by the HSDPA acquires the cell ID of the serving cell of the communication terminal 3 from the broadcast information received from the network 6 (step S62). Then, the communication detection section 34 outputs the acquired cell ID to the storage section 35 (step S63). The storage section 35 stores the cell ID output from the communication detection section 34 (step S64).

The movement detection section 36 extracts the cell ID from the broadcast information transmitted from the network 6. The movement detection section 36 detects that the serving cell has changed based on the change of the extracted cell ID (step S65). The movement detection section 36 outputs the notification that the serving cell has changed along with the cell ID after the change to the judgment section 37 (step S66).

When receiving the notification that the serving cell has changed from the movement detection section 36, the judgment section 37 searches the storage section 35 based on the cell ID received along with the notification (step S67). When the cell ID received from the movement detection section 36 is stored in the storage section 35, the judgment section 37 generates the area information indicating "within the HSDPA service area zone" (step S68) and outputs the area information to the recognition section 38 (step S69). When receiving the area information from the judgment section 37, the recognition section 38 displays the antenna mark 180 with the vertical bar indicating "within the HSDPA service area zone" on the display section 39 (step S70).

The function and the effect of the present embodiment will be described. As described above, the cell ID when the communication by the HSDPA was performed is stored in the storage section 35. Due to this, it is possible to reserve an information about the cell located within the HSDPA service area inside the communication terminal 3. When the serving cell changes and the cell ID of the serving cell after the change is stored in the storage section 35, the recognition section 38 displays the antenna mark 180 indicating "within the HSDPA service area zone" on the display section 39. Due to this, it is possible to judge without connecting to the network that the communication by the HSDPA is possible in the cell of the base station where the communication by the HSDPA has once been performed.

Incidentally, the present invention is not limited to the embodiments described above and various modifications are possible.

For example, the service-availability information is assumed to include the area information and the resource information, however, it may be assumed to include either the area information or the resource information.

Further, the communication detection section is assumed to detect termination of the communication by the HSDPA, however, it may be assumed to detect that the communication by the HSDPA is being performed.

Furthermore, the antenna mark is used to display the area information and the resource information, however, symbols other than the antenna mark may be used. Alternatively, instead of displaying the antenna mark, voices in accordance with the area information and the resource information may be output.

What is claimed is:

1. A communication terminal capable of packet communication, comprising:
   a first detection means for detecting termination of packet communication, identifying cell identification information of a serving cell of the terminal based on a broadcast information received from a network when detecting termination of packet communication, and storing the identified cell identification information in a storage means;
   a second detection means for detecting that the serving cell of the terminal has changed, by extracting the cell identification information included in the broadcast information each time the broadcast information is transmitted from the network to the terminal and judging that the serving cell has changed when the extracted cell identification information differs from the previously extracted cell identification information;
   a judgment means for judging whether or not the cell identification information, after the change detected by the second detection means, is stored in the storage means, by receiving notification that the serving cell has changed from the second detection means and searching for the cell identification information received along with the notification from among the cell identification information stored in the storage means, and for outputting an area information indicating within a service area zone; and
   a recognition means for receiving the area information indicating within a service area zone from the judgment means and making a user recognize by a display means that packet communication is possible in said cell.

2. The communication terminal according to claim 1, wherein packet communication is high speed data communication.

3. The communication terminal according to claim 2, wherein said high speed data communication is the communication by HSDPA.

4. The communication terminal according to claim 1, further comprising:
   a third detection means for detecting a predetermined operation by the user, the predetermined operation indicating a requirement to use packet communication for the communication terminal, and for instructing a request means at the communication terminal to make a request upon detection of the predetermined operation.

5. The communication terminal according to claim 4, wherein the predetermined operation is at least one of opening the communication terminal or pressing a dedicated button on the communication terminal.

6. A communication terminal comprising:
   a first detector configured to detect termination of packet communication, identifying cell identification information of a serving cell of the terminal based on a broadcast information received from a network when detecting termination of packet communication, and storing the identified cell identification information in a storage;
   a second detector configured to detect that the serving cell of the terminal has changed, by extracting the cell identification information included in the broadcast information each time the broadcast information is transmitted from the network to the terminal and judging that the serving cell has changed when the extracted cell identification information differs from the previously extracted cell identification information;
   a decider configured to judge whether or not the cell identification information, after the change detected by the second detector, is stored in the storage, by receiving notification that the serving cell has changed from the second detector and searching for the cell identification information received along with the notification from among the cell identification information stored in the storage, and for outputting an area information indicating within a service area zone; and an indicator configured to receive the area information indicating within a service area zone from the decider and making a user recognize by a display that packet communication is possible in said cell.

7. The communication terminal according to claim 6, further comprising:

a third detector configured to detect a predetermined operation by the user, the predetermined operation indicating a requirement to use packet communication for the communication terminal, and configured to instruct the requestor to make a request upon detection of the predetermined operation.

8. The communication terminal according to claim 7, wherein the predetermined operation is at least one of opening the communication terminal or pressing a dedicated button on the communication terminal.

* * * * *